United States Patent Office 2,991,313
Patented July 4, 1961

2,991,313
POLYETHERS
Wilhelm Bongard, Koln, and Erwin Müller, Otto Bayer, and Manfred Theis, Leverkusen, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Jan. 15, 1958, Ser. No. 709,003
Claims priority, application Germany Jan. 23, 1957
4 Claims. (Cl. 260—613)

This invention relates generally to a method of preparing polyethers and, more particularly, to a method for making polyethers especially well suited for reaction with a polyisocyanate to form a polyurethane.

It has been proposed heretofore to produce an ether by reacting a chloromethyl compound with an alcohol. Ethers of relatively high molecular weight are prepared by such a process when the alcohol is a polyhydric alcohol and/or the chloromethyl compound is a polychloromethyl compound. In accordance with this process, the chloromethyl compound reacts with the alcohol to form a polyether and hydrogen chloride. Organic compounds having chloromethyl groups in the allyl position with respect to a double bond between carbon atoms, such as, for example, allyl chloride or benzyl chloride, have proved to be particularly well suited for these prior art processes. The chemical reaction is not complete even when these compounds are used and, moreover, the hydrogen chloride liberated during the reaction frequently causes secondary reactions which produce compounds which bring about discoloration of the resulting ether. Such secondary reactions are particularly disadvantageous in the production of polyethers of relatively high molecular weight because separation of the desired polyether from the undesirable reaction products is very difficult or impossible.

It has been proposed to add an alkali, such as an aqueous sodium hydroxide solution, an alcoholic solution of potassium hydroxide, or a tertiary base, to the reaction mixture to combine with the hydrogen chloride. Such a process has the disadvantage that inorganic salts are formed in the reaction mixture and must be separated by washing which is very difficult when polyethers of high molecular weight are produced.

It is therefore an object of this invention to provide a method for making polyethers which is devoid of the aforesaid disadvantages of the prior art processes. Another object of the invention is to provide an improved method for making polyethers of high molecular weight which are substantially free from undesirable reaction products. Still another object of the invention is to provide a method for making polyethers from polyhydroxy compounds and polychloromethyl compounds and for easily separating them from any undesirable side reaction products. A more specific object of the invention is to provide a method for making high molecular weight polyethers and for separating the desired product from undesirable side reaction products.

Generally speaking, the foregoing objects and others are accomplished in accordance with this invention by providing a method wherein a polyhydroxy compound is reacted with an $\alpha,\beta$-unsaturated chloromethyl compound having at least two chloromethyl groups while the reactants are in admixture with an alkylene oxide. More specifically, the invention contemplates the preparation of polyethers by reacting a polyhydroxy compound with a compound containing at least two chloromethyl groups attached to a carbon atom which is attached to an unsaturated carbon atom while reacting the resulting hydrogen chloride liberated during the chemical reaction with an alkylene oxide. The alkylene oxide acts as an acceptor for the hydrogen chloride and makes it possible to carry out the chemical reaction under substantially neutral conditions. The chloromethyl compound may be an $\alpha,\beta$-unsaturated chloromethyl aliphatic or aromatic compound.

The novel hydrogen chloride acceptor provided by this invention may be used in the preparation of a polyether from any suitable $\alpha,\beta$-unsaturated chloromethyl organic compound and any suitable polyhydroxy compound. The hydrogen chloride formed will be absorbed by the alkylene oxide regardless of the internal structure of the organic compound with the only requirement being that the compound have at least two terminal chloromethyl groups attached to an unsaturated carbon atom. The invention thus contemplates a process in which the polyether is prepared from any suitable $\alpha,\beta$-unsaturated polychloromethyl compound, such as, for example, 1,4-dichlorobutene, meta-xylylene chloride, para-xylylene chloride, 4,4'-bis-(chloromethyl)diphenyl sulfone, 4,4'-bis-(chloromethyl)diphenyl sulfide, 4,4'-bis-(chloromethyl)diphenyl methane, 4,4'-bis-(chloromethyl)diphenyl dimethyl methane, 4,4'-bis-(chloromethyl)diphenyl ether, and the like. It is thus apparent that the double bond may occur in either an aromatic ring or an aliphatic chain. 4,4'-bis-(chloromethyl)diphenyl ether has been found to be particularly well suited for making polyethers of high molecular weight and is therefore preferred over the other compounds of this type.

Any suitable polyhydroxy compound may be used, but it is preferred to react polyhydric alcohol with the chloromethyl compound to form the polyether. Examples of suitable polyhydric alcohols include, for example, the dihydric alcohols, including diethylene glycol, propylene glycol, butane dihydroxy ethyl alcohol, and the trihydric alcohols, such as, for example, trimethylol propane, glycerol and the like. Any other suitable compound having at least two aliphatically bonded hydroxyl groups, such as, for example, ortho-phenylene-$\beta$-dihydroxy ethyl ether, m-phenylene-$\beta$-dihydroxy ethyl ether, p-phenylene-$\beta$-dihydroxy ethyl ether, 4,4'-diphenyl dimethyl methane-$\beta$-dihydroxy ethyl ether and the like, may be used. A mixture of dihydric alcohols and alcohols having more than two hydroxyl groups may be used in order to produce a polyether having a predetermined amount of branching. The degree of branching in the polyether is obtained by varying the proportion of dihydric alcohol to alcohol having more than two hydroxyl groups.

Any suitable alkylene oxide may be added to the reaction mixture containing the chloromethyl compound and polyhydroxy compound, the requirements for such oxides being that they form a halohydrin by reaction with the hydrogen chloride which can be removed from the reaction mixture by distillation. Such a process enables the separation of the desired polyether from the undesired hydrogen chloride and the resulting halohydrin can be reconverted into the alkylene oxide, making it possible to employ a cyclic process with the reconverted alkylene oxide being directed back into the reaction mixture. The examples of suitable alkylene oxides include ethylene oxide, propylene oxide, butylene oxide, amylene oxide, and the like.

The components of the reaction may be mixed together in any proportions depending upon the nature of the product desired. Molecular proportions of the two compounds may be used or more chloromethyl compound may be used than polyhydroxy compound. It is also possible to use more polyhydroxy compound than chloromethyl compound in the reaction mixture if a preponderance of organic radicals derived from the polyhydroxy compound are desired in the polyether. If an excess of the chloromethyl compound is used, the product will have terminal chlorine atoms, while the product will have terminal hydroxyl groups if an excess of the polyhydroxy compound is used. Polyethers having terminal hydroxyl groups are particularly well suited for reacting with organic polyisocyanates to form rubber-like homogeneous polyurethanes or cellular polyurethanes which may be used in making vehicle tires, sponges or the like. The polyether having terminal chlorine atoms may be further reacted with hydroxy compounds to form polyethers which may then be used in preparing useful polyurethane products, such as sponges, vehicle tires or the like, by reaction of the polyether with an organic polyisocyanate.

In one preferred mode of practicing the invention, the alkylene oxide is introduced into the reaction mixture containing the chloromethyl compound and polyhydroxy compound after the mixture has been heated to an elevated temperature. Chlorohydrin is formed immediately as reaction between the chloromethyl and polyhydroxy compound proceeds and is immediately removed from the reaction mixture if the reaction mixture is maintained at a temperature where the chlorohydrin will distill. It is preferred to operate in this way in order to insure rapid removal of the hydrogen chloride. The progress of the condensation reaction can be observed by increase in viscosity of the reaction mixture. The reaction mixture may be heated to the elevated temperature and the vessel in which the heating is effected may be evacuated. In any event, an alkylene oxide must be present in the reaction mixture.

Polyethers of any molecular weight greater than the molecular weight of the polyhydric alcohol and chloromethyl compound may be prepared in accordance with this invention and are contemplated. However, polyethers having a molecular weight of at least about 700 are preferred.

The chemical reaction which produces the polyether substantially free from undesirable side reaction products may be represented by the following general equation:

$$ClH_2C-R-CH_2Cl + HO-R_1-OH + R_2HC\underset{O}{\underset{\diagdown\diagup}{-(X)-}}CHR_2 =$$

$$H(O-R_1-O-CH_2-R-CH_2-O)-R_1-OH + HOCR_2H-(X)-CR_2HCl$$

wherein R is a divalent organic radical having an unsaturated carbon atom attached to the carbon atom of each chloromethyl group; $R_1$ is a divalent aliphatic or aromatic radical; $R_2$ is hydrogen or a methyl group; X is either 0, 1, 2 or 3 —$CH_2$— groups. Using 1,4-dichlorobutene as an example of the chloromethyl compound, ethylene oxide as an example of an acceptor for the hydrogen chloride and ethylene glycol as the alcohol, the chemical reaction may be represented as follows:

$$ClH_2C-CH=CH-CH_2Cl + HOH_2C-CH_2OH + H_2C\underset{O}{\underset{\diagdown\diagup}{-}}CH_2 =$$

$$H(O-H_2C-CH_2-O-CH_2-CH=CH-CH_2-O)_n-H_2C-CH_2OH + HO-CH_2-CH_2Cl$$

wherein $n$ is an integer.

The products obtained by the process of the invention are completely free from chlorine if an excess of the polyhydroxy compound has been used. Undesired secondary reactions, for example, etherification of the chloromethyl compounds with the glycol chlorohydrin being formed, does not occur since the boiling point of the latter is below the reaction temperature.

The products obtainable by the process of the invention are yellow viscous oils, which can be obtained in a form completely free from halogen and can, for example, be used as plasticizers or an inntial materials for lacquers. On account of their reactive terminal groups, in particular hydroxyl groups, they can serve as initial material for further reactions to form plastics of high molecular weight.

In order better to describe and further clarify the invention, the following are specific embodiments thereof:

*Example 1*

About 402 grams of 4,4'-di-(chloromethyl)diphenyl ether, about 100 grams of trimethylol propane and about 200 grams of 1,2-propylene glycol are introduced into a flask equipped with a supply pipe, stirrer mechanism, thermometer and reflux condenser. Ethylene oxide is passed through and the mixture is gradually heated to from about 180° C. to about 200° C., so that no free hydrogen chloride escapes. The glycol chlorohydrin formed distills out of the reaction mixture at an internal temperature of about 150° C. The condensation is continued until no further glycol chlorohydrin distills over and the etherification is completed in vacuo at from about 12 mm. to about 20 mm. and from about 180° C. to about 200° C. A yellow viscous oil is formed, this oil having an hydroxyl number of 211 and no longer showing any Beilstein reaction. After the ethylene oxide also condensed during the distillation has been evaporated off, 241 grams of glycol chlorohydrin are obtained in the distillate.

*Example 2*

Using the experimental conditions indicated in Example 1, about 134 grams of 4,4'-di-(chloromethyl)diphenyl ether and about 105 grams of trimethylol propane are reacted while introducing ethylene oxide. After the glycol chlorohydrin has been distilled off, a viscous oil remains which has an hydroxyl number of 338 and which is free from chlorine.

*Example 3*

Under the experimental conditions indicated in Example 1, about 804 grams of 4,4'-di-(chloromethyl)diphenyl ether and about 475 grams of diethylene glycol are reacted while introducing ethylene oxide. A product is obtained which has an hydroxyl number of 198.

*Example 4*

Under the experimental conditions indicated in Example 1, about 125 grams of dichlorobutene-1,4 and about 138 grams of hexanediol are reacted while introducing ethylene oxide and a viscous oil is obtained which has an hydroxyl number of 98.

*Example 5*

Under the conditions indicated in Example 1, the ethylene oxide is replaced by propylene oxide. The propyl chlorohydrin which is formed is then distilled off at about 127° C., and a condensation product is obtained which has the hydroxyl number indicated in Example 1.

*Example 6*

Under the conditions indicated in Example 1, about 402 grams of diphenyl-dichloromethyl ether and about 80 grams of 1,2-propylene glycol are condensed under the action of ethylene oxide. A condensation product is obtained which has a chlorine content of 8.2 percent.

Any member of the class of chloromethyl compounds and of the class of polyhydroxy compounds disclosed as operable herein may be substituted for the particular chloromethyl compound and polyhydroxy compound used in the foregoing examples. Likewise, any other suitable alkylene oxide may be substituted in the foregoing examples for the one specified.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A method for making a polyether which comprises reacting a polyhydric alcohol having as its sole reactive groups, primary hydroxyl groups, said alcohol having from 3 to 19 carbon atoms with an $\alpha,\beta$-unsaturated chloromethyl compound having at least two chloromethyl groups and having a 4 to 17 carbon atoms while said compounds are in admixture with an alkylene oxide, selected from the group consisting of ethylene oxide, propylene oxide, butylene oxide, and amylene oxide, and at a temperature whereby the resulting halohydrin is removed by distillation from the reaction mixture substantially as soon as it is formed.

2. The process of claim 1 wherein said alkylene oxide is ethylene oxide.

3. The process of claim 1 wherein said alkylene oxide is propylene oxide.

4. The process of claim 1 wherein said $\alpha,\beta$-unsaturated chloromethyl compound is 4,4'-(chloromethyl) diphenyl ether.

References Cited in the file of this patent

UNITED STATES PATENTS

| | | |
|---|---|---|
| 2,060,715 | Arvin | Nov. 10, 1936 |
| 2,788,350 | Lafyatis et al. | Apr. 9, 1957 |

FOREIGN PATENTS

| | | |
|---|---|---|
| 456,278 | Great Britain | Nov. 2, 1936 |

OTHER REFERENCES

Karrer: Organic Chemistry, 4th edition (1950), page 244.

UNITED STATES PATENT OFFICE

CERTIFICATE OF CORRECTION

Patent No. 2,991,313 July 4, 1961

Wilhelm Bongard et al.

It is hereby certified that error appears in the above numbered patent requiring correction and that the said Letters Patent should read as corrected below.

Column 3, line 47, for that portion of the formula reading "$H(O-R_1-O-CH_2-R-CH_2-O)-R_1-OH$" read -- $H(O-R_1-O-CH_2-R-CH_2-O)_n-R_1-OH$ --; line 53, after "groups" insert -- and n is an integer --; same column 3, line 73, for "inntial" read -- initial --; column 5, line 18, strike out "a".

Signed and sealed this 2nd day of January 1962.

(SEAL)
Attest:

ERNEST W. SWIDER
Attesting Officer

DAVID L. LADD
Commissioner of Patents